S. S. PUTNAM.
Curtain Fixture.
No. 443.
Reissued Mar. 31, 1857.
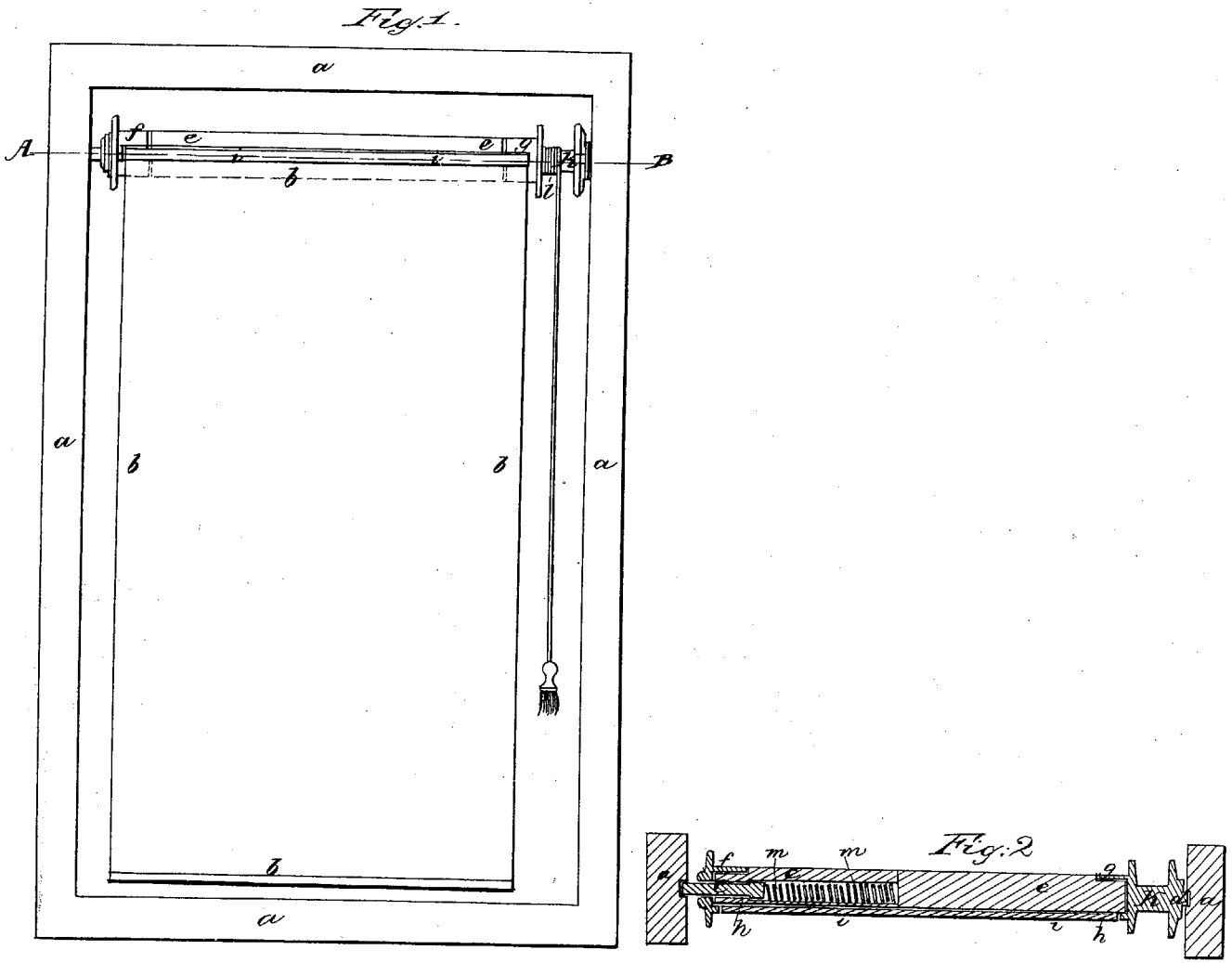
N. PETERS, PHOTO-LITHOGRAPHER, WASHINGTON, D. C.

UNITED STATES PATENT OFFICE.

SILAS S. PUTNAM, OF BOSTON, MASSACHUSETTS.

IMPROVEMENT IN WINDOW-CURTAIN FIXTURES.

Specification forming part of Letters Patent No. 8,041, dated April 15,1851; Reissue No. 443, dated March 31, 1857.

*To all whom it may concern:*

Be it known that I, SILAS S. PUTNAM, of Boston, in the county of Suffolk and State of Massachusetts, have invented a new and useful Improvement in Window-Curtain Fixtures, of which the following is a full, clear, and exact description, reference being had to the annexed drawings, making part of this specification, in which—

Figure 1 is an elevation of a window-frame with my improved fixtures arranged therein; Fig. 2, a horizontal section upon the line A B of Fig. 1.

Heretofore window-curtains have been attached to the rods upon which they are rolled by tacking their upper edge thereon. This method is objectionable on account of the difficulty in securing the curtain so that it shall hang exactly true, and also on account of the necessity of occasionally removing it from the roll for the purpose of cleansing. To remedy these objections is the object of my present invention, which consists in attaching the curtain to its roll by a piece or strip which fits into a groove in the roll, and is secured thereto by caps at the ends, as will now be more fully described.

*a a a a* represent the window-frame, and *b b b b* the curtain, made in the usual way, the former having two steps or bearings for the insertion of the outer ends of the journals *c d* of the curtain-roller *e e*. The curtain-roller *e e* is of the shape shown in Figs. 1 and 2, and has at each end a cap, *f g*, one of which may be so arranged as to be easily taken off. A groove, *h h*, is formed along the whole length of the roller, into which is fitted a long fastening-bar, *i i*, said fastening-bar having at each end a proper rabbet or shoulder, which slides and fits under said caps *f g*, as shown in Fig. 2 and by dotted lines in Fig. 1. By this arrangement, when the upper end of the curtain is fitted over the groove in the curtain-roller and one rabbet of the fastening-bar passed under the corresponding cap, (the other cap being removed,) the said bar may be pressed down into the groove aforesaid with the cloth beneath it, and then by adjusting the other cap over the corresponding rabbet of the fastening-bar the whole will be held firmly together, as will be readily understood by inspection of the drawings. On the side of one of the caps *g* is the usual grooved pulley, *k*, on which the raising-cord *u* is wound in the usual way. One end of the curtain-roller is bored out to the extent shown in Fig. 2, for the insertion of the spiral spring *m m*, the outer end of which spring presses against the inner end of the movable journal *c* of the curtain-roller *e e*. This journal *c* plays freely in a lateral direction through a proper hole formed at the center of the cap, and the pressure of the spiral spring upon said journal will create sufficient friction upon its bearing end to hold the curtain stationary in any position in which it may be arranged.

It will be perceived that by making one of the caps of the curtain-roller removable I am enabled to manufacture the rolls of a uniform length and to adjust them to windows of various widths at the time of putting them up.

What I claim as my invention, and desire to secure by Letters Patent, is—

Attaching the curtain to its roll by a piece or strip which fits into a groove in the roll and is secured thereto by caps at the ends, in the manner substantially as herein set forth.

SILAS S. PUTNAM.

Witnesses:
SAM. COOPER,
THOS. R. ROACH.